Patented Jan. 11, 1927.

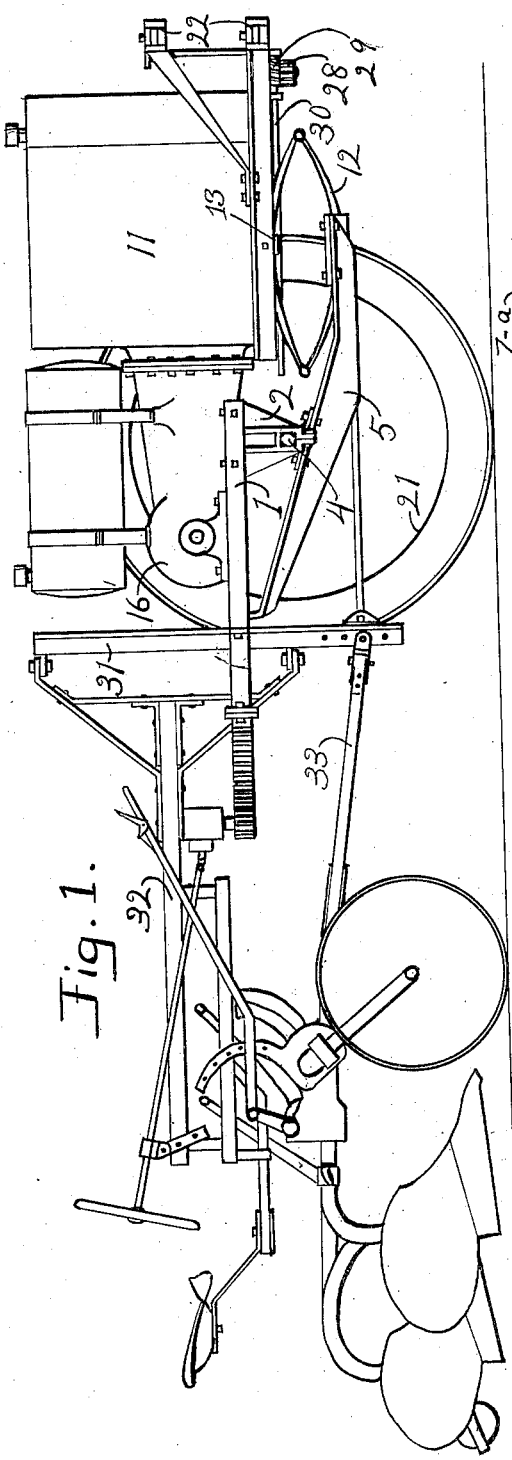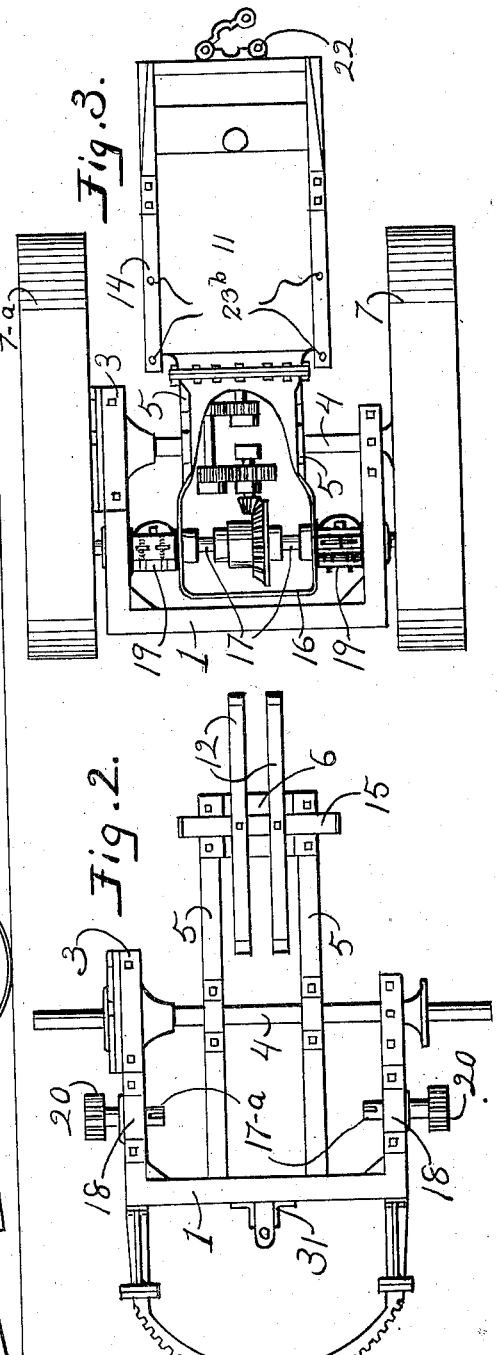

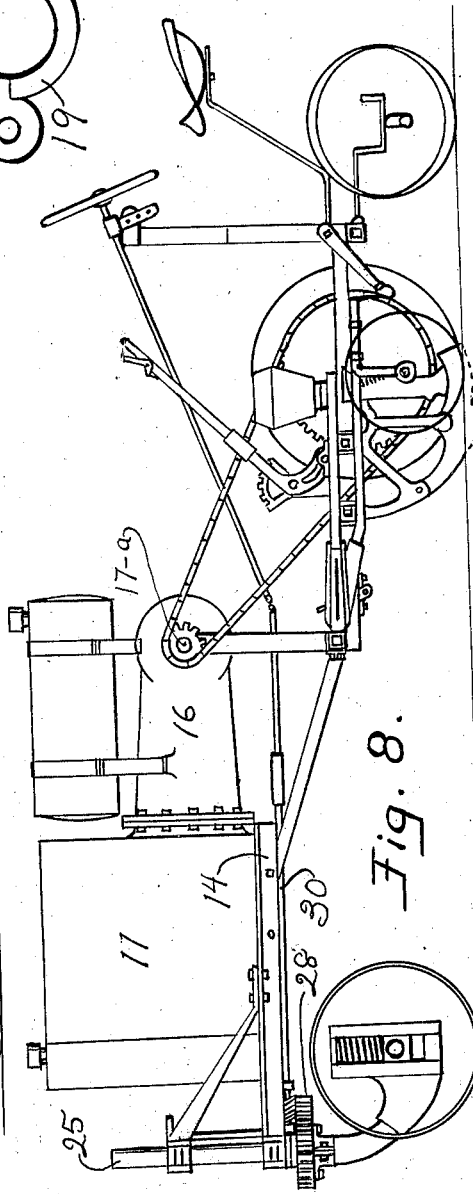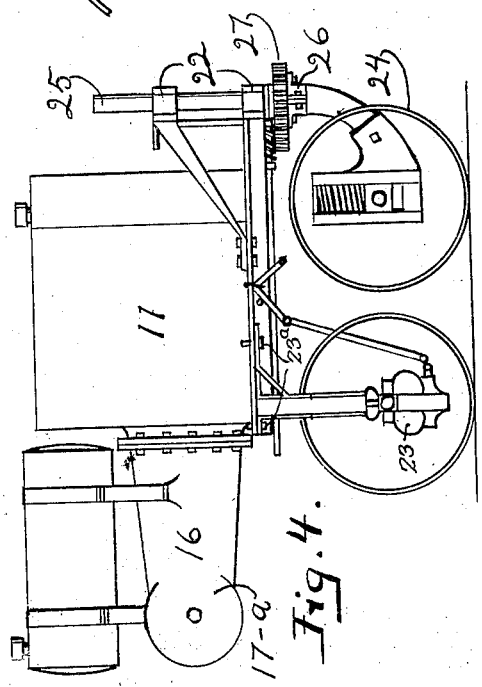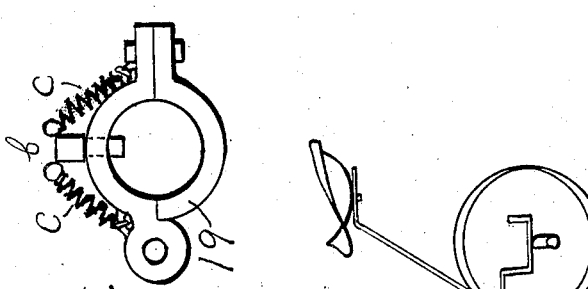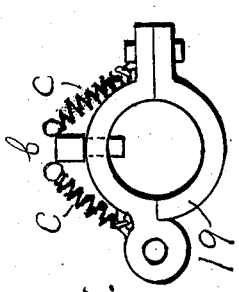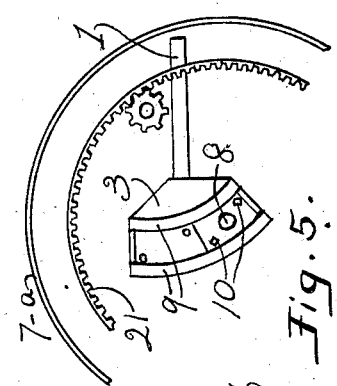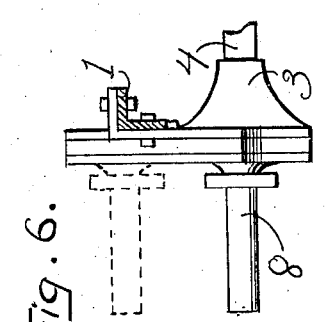

1,613,681

UNITED STATES PATENT OFFICE.

LESTER M. THOMPSON, OF TAYLORVILLE, ILLINOIS.

TRACTOR.

Application filed January 12, 1923. Serial No. 612,276.

This invention relate to farm tractors, and its objects are as follows: To provide a two wheel tractor with a frame that will permit the spring mounting of the motor; to so mount the motor in such a tractor that it may be readily removed and connected directly to machines; to provide means for lowering the tractor frame on the left or land wheel, so that the tractor will run level when plowing with the right wheel in the furrow; to provide the motor in such a tractor with a supplemental steering rod and means whereby steer wheels may be connected to the motor when it is used with other machines.

With these and other objects in view the invention resides in the combination and arrangement of parts and in the details of construction hereinafter described and claimed, it being understood that changes in the embodiment of the invention can be made within the scope of the claims without departing from the spirit of the invention.

In the accompanying drawings:

Figure 1 is a right hand elevation of the tractor with the right hand wheel removed;

Figure 2 is a plan of the main frame;

Figure 3 is a plan of the tractor without rear extension and with the top of the transmission housing cut away;

Figure 4 is a right elevation of the motor removed from the tractor on steer wheels and wheeled jack;

Figure 5 is a left elevation of the left wheel-holding element;

Figure 6 is a front elevation of the left wheel-holding element;

Figure 7 is an end elevation of a differential shaft clamp;

Figure 8 is a right elevation of the motor connected to a planter.

The main frame of the tractor consists of the U-shaped bar 1, the members 2 and 3 by which it is mounted on the axle 4, the spring mounting elements 5 fixed to the rear of 1 and to the axle 4, and the plate 6 that connects the front ends of the elements 5. Traction wheel 7 is mounted on the axle 4, and on the other end of this axle the element 3 (Figures 2, 5 and 6) is fixed. This element has a recess in its outer side in which an axle stub 8 is slidably mounted. Two clips 9 overlap the base of the stub and hold it in the recess. Bolts 10 hold the stub in normal position (Figures 5 and 6), and the left wheel $7^a$ is mounted on this stub. When plowing with the right wheel in the furrow, the bolts 10 are removed and the tractor sinks on the left wheel till the axle stub 8 is in the position indicated by the dotted lines in Fig. 6.

The motor 11 is supported on the springs 12, being secured to the springs by bolts 13, (one of which is seen in Fig. 1) that pass through the frame 14 and flanges on the ends of the bar 15 that is fixed to the springs. A housing or case 16 for the transmission and differential is bolted rigidly to the motor 11. Each of the differential shafts 17 is in two sections, and the main sections extend outward from the housing as shown on the right side in Fig. 3. The outer sections of these shafts $17^a$ are mounted in bearings 18 fixed to the frame member 1. Clamps 19 (Figures 3 and 7) lock the sections together. Pinions 20 on the sections $17^a$ mesh with the gears 21 on the drive wheels.

The clamps 19 are hinged at the rear so that one bolt holds the two halves of each clamp together. In the adjoining ends of the shaft sections are slots to receive two bolts $b$ that slidably extend through openings in one half of each clamp, springs $c$ holding the bolts in place (Fig. 7).

The frame 14 is fixed to the base of the motor, and to the front of this frame hinged bearings 22 (shown open in Fig. 3) are bolted. When the motor is to be removed from the tractor and connected to some other machine, as a planter or cultivator, a suitable wheeled jack 23 is run in under the motor and locked to its frame by bolts $23^a$ which pass through holes $23^b$ in the frame 14. This jack has two uprights mounted on the wheels, with members fixed at right angles to the upper ends of the uprights that lock to the motor and hold the jack rigid with the motor. Then steering wheels 24 on a pintle 25 are connected to the frame by inclosing the pintle in the bearings 22. On this pintle is a clamp 26 to which a gear 27 is bolted, and this gear is engaged by a pinion 28 that may be rotated by a worm gear 29 on the rod 30 that is hung under the motor. Clamps 19 are removed, bolts 13 are withdrawn and the motor is free to be drawn away from the tractor and wheeled into position for connecting to the machine, as to a planter as shown in Fig. 8, the clamps 19 being used to lock the differential shafts 17 to sprocket-holding shafts mounted on the planter, the ends of these shafts having slots to receive the bolts in the clamps. If the slots in the differential shafts are not in line with those in the sprocket shafts the clamps are bolted lightly together and each is turned until one of the bolts snaps into place, then the motor is started and the unlocked shafts will turn in the bearings until the other bolts enter their respective slots. Then the clamps may be tightened.

A vertical drawbar 31 is fixed to the main frame and suitably braced. A control supporting element 32 and draft member 33 are pivotally connected to this drawbar.

I claim:

1. In a tractor, in combination, drive wheels; an axle between the wheels; a U-shaped frame having the arms thereof mounted on the axle with the opening in the U toward the front of the tractor; elements fixed to the rear of the U-frame and to the axle and extending forwardly therefrom; springs mounted on the forward part of said elements; a motor mounted on the springs; transmission elements between the motor and the drive wheels and mounted on the U-frame.

2. In a tractor, in combination, drive wheels; an axle between the wheels; a U-shaped frame mounted on the axle with the opening in the U toward the front of the tractor; elements fixed to the rear of the U-frame and to the axle and extending forwardly therefrom; springs on the forward part of said elements; a motor detachably mounted on the springs; transmission elements between the motor and the wheels; said elements including detachable differential shafts rotatably mounted on the U-frame.

3. In a two wheeled tractor, in combination, an axle between the wheels; a U-shaped frame mounted on the axle with the opening in the U toward the front of the tractor; elements fixed to the rear of the U-frame and to the axle and extending forwardly therefrom; springs on the forward part of said elements; a motor detachably mounted on the springs; transmission elements between the motor and the wheels; said elements including detachable differential shafts rotatably mounted on the U-frame; and parts fixed to the motor whereby it may be mounted on steer wheels when detached.

4. In a two wheeled tractor, in combination, a removable motor; springs detachable supporting the motor; the motor having a base adapted for engagement with temporary supporting elements that may be used in removing it; transmission elements between the motor and the wheels; said transmission elements including detachable differential shafts; and a transmission housing rigidly fixed to the motor.

5. A tractor having two laterally spaced ground wheels; a main axle between the wheels; a frame mounted on said axle; a stub axle; an element on one side of the frame adapted to hold the stub axle in line with the main axle, but permitting it to be raised and held in a higher position relative thereto; a member extending rearwardly from the frame and pivotally connected thereto for lateral movement, and adapted to be mounted on the implement to which the tractor is attached; springs on the frame; a motor detachably mounted on the springs; gears on the wheels; transmission elements between the motor and the gears; said elements including differential shafts, each of which has an inner and outer section, the outer section being mounted on the frame; removable clamps adapted to lock the inner and outer sections together; and pinions on the outer sections engaging the gears on the ground wheels.

6. A tractor having two laterally spaced ground wheels; an axle between said wheels; a main frame mounted on the axle; said frame including a U-shaped member above the axle and extending rearwardly therefrom and two bars hung beneath the axle and fixed to the rear of the U-shaped member and extending forwardly from the axle; springs mounted on the forward portion of said bars; a motor detachably mounted on the springs; gears on the ground wheels; transmission elements between the motor and the gears; said elements including differential shafts, each of which having an inner and an outer section, the outer sections being rotatably mounted on the main frame; removable clamps adapted to lock the inner and outer sections together in alignment; pinions on the outer sections engaging the gears on the ground wheels; a housing for the transmission rigidly fixed to the motor and inclosing the differential shafts between the clamps; a vertical drawbar fixed to the main frame; a gear segment fixed to the main frame; a member pivoted to the drawbar for lateral movement, and adapted to be mounted on the implement to which the tractor is attached; a pinion on the member and engaging the segment; a pilot wheel and rod on the member to rotate the pinion for steering the tractor; a frame fixed to the motor and extending forwardly therefrom; two bearings fixed to the front of said frame, said bearings being hinged to open outwardly for receiving the pintle of steer wheels when the motor is to be used with other machines and auxiliary steering mechanism on the motor and adapted to control said steer wheels.

7. A tractor having two laterally spaced ground wheels; a main axle on which the right hand wheel is mounted; a main frame on the main axle; a stub axle for the left wheel held by the main frame, the latter being adapted to permit the raising of the stub axle; springs on the main frame; a motor detachably mounted on the springs; gears on the wheels; transmission elements between the motor and the gears; said elements including differential shafts, each of which having an inner and an outer section, the latter being rotatably mounted on the main frame; removable clamps to lock the inner and outer sections together in alignment; a transmission case rigidly fixed to the motor and inclosing the differential shafts between the clamps; a vertical drawbar fixed to the main frame; a member pivoted to the drawbar for lateral movement and adapted to be mounted on the implement to which the tractor is attached; steering mechanism on the member; a frame fixed to the motor; bearings fixed to said frame and hinged to open to receive the pintle of steer wheels when the motor is detached from the tractor and connected to other machines; and auxiliary steering mechanism mounted on the motor and adapted to engage a gear on the pintle of the steer wheels.

8. A two wheeled tractor having an axle between the wheels; a frame having an upper and a lower part, the upper part being substantially U-shaped and having the arms thereof mounted on the axle, the lower part being fixed to the rear of the U and to the axle and projecting forwardly therefrom; springs forwardly mounted on the lower part of the frame; a motor detachably mounted on the springs, said motor having a base adapted for engagement with temporary supporting elements; transmission elements between the motor and the wheels; said elements including detachable differential shafts rotatably mounted on the arms of the U.

9. A two wheeled tractor having an axle between the wheels; a frame having an upper and a lower part, the upper part being substantially U-shaped and having the arms thereof mounted on the axle, the lower part being fixed to the rear of the U and to the axle and projecting forwardly therefrom; springs forwardly mounted on the lower part of the frame and below the level of the axle; a motor mounted on the springs; transmission elements between the motor and the wheels; said elements including differential shafts rotatably mounted on the arms of the U; a housing for the shafts and the transmission elements between the shafts and the motor, said housing being rigidly fixed to the motor and independent of the frame; a member extending rearwardly from the upper part of the frame and pivotally connected thereto for lateral movement and adapted to balance the tractor and to be mounted on the implement to which the tractor is attached; a gear segment fixed to the frame; a pinion on the rear member engaging the segment; and mechanism on the rear member to rotate the pinion for steering the tractor.

10. The combination in a two wheeled tractor of a main axle between the wheels; a frame having an upper and a lower part, the upper part being mounted on the main axle and projecting rearwardly therefrom, the lower part of the frame being fixed to the upper part and to the axle and projecting forwardly therefrom; a stub axle; an element fixed to the upper part of the frame and adapted to normally hold the auxiliary axle in line with the main axle but permitting it to be raised and held in a higher position relative thereto; a motor detachably supported by the forward portion of the lower part of the frame; transmission elements between the motor and the wheels; said elements including differential shafts each of which has an inner and an outer section detachably connected and held in alignment, the outer sections being rotatably mounted on the upper part of the frame; and a housing for the inner sections and the transmission between them and the motor, said housing being rigidly fixed to the motor and independent of the frame.

11. In a two wheeled tractor, in combination, a main axle between the wheels; a frame having an upper and a lower part, the upper part being substantially U-shaped and having arms thereof mounted on the main axle, the lower part being fixed to the rear of the U and to the main axle and extending forwardly therefrom; a stub axle; an element fixed to one of the arms of the U and to the main axle and adapted to normally hold the stub axle in line with the main axle, but permitting it to be raised and held in a higher position relative thereto; springs forwardly mounted on the lower part of the frame; a motor detachably mounted on the springs, the frame and the mounting of the springs being adapted to permit the use of a wheeled jack in detaching the motor from the tractor; transmission elements between the motor and the wheels, said elements including detachable differential shafts; and a transmission housing that is rigidly fixed to the motor and is independent of the frame.

12. The combination in a two wheeled tractor of a frame wholly supported by the wheels; a member extending rearwardly from the frame and pivotally connected thereto for lateral movement, and adapted to be mounted on an implement to which the tractor is attached; steering mechanism on said member; springs on the frame; a motor detachably mounted on the springs; transmission elements between the motor and the wheels, said elements being adapted to permit the ready detachment of the motor from the tractor; elements connected to the motor to hold the pintle of steer wheels when the motor is to be detached for use with other machines; and auxiliary steering mechanism on the motor to control the steer wheels.

13. In a two wheeled tractor, in combination, a frame between the wheels; said frame including a member above the axis of the wheels and extending rearwardly therefrom, elements fixed to said member and positioned beneath the axis of the wheels and extending forwardly from the axis, and a plate on the forward ends of said elements; springs on the plate; a motor detachably mounted on the springs; gears on the wheels; transmission elements between the motor and the gears; said elements including differential shafts each having an inner and an outer section detachably connected and held in alignment, the outer sections being rotatably mounted on the upper frame member; pinions on the outer sections engaging the gears on the wheels; a vertical drawbar fixed to the frame; a member extending rearwardly from the drawbar and pivoted thereto for lateral movement and adapted to be mounted on the implement to which the tractor is attached; steering mechanism on said member; elements connected to the motor whereby it may be forwardly supported on steer wheels when removed from the tractor; and auxiliary steering mechanism hung beneath the motor to control the steer wheels.

14. The combination in a two wheeled tractor of a frame between the wheels; a member extending rearwardly therefrom and pivotally connected thereto for lateral movement, and adapted to be mounted on the implement to which the tractor is attached; steering mechanism on said member; a motor detachably supported by the frame; transmission elements between the motor and the wheels, said elements being adapted to permit the ready detachment of the motor from the tractor; elements fixed to the front of the motor to receive and rotatably mount the pintle of steer wheels when the motor is to be detached for use with other machines; and auxiliary steering mechanism connected to the motor so as to engage a gear on the pintle of the steer wheels.

In testimony whereof I affix my signature.

LESTER M. THOMPSON.